United States Patent
Fisher (10) Patent No.: US 7,100,039 B2
(45) Date of Patent: Aug. 29, 2006

(54) SYSTEMS AND METHODS FOR A BOOTSTRAP MECHANISM FOR SOFTWARE EXECUTION

(75) Inventor: Jeffrey O. Fisher, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 504 days.

(21) Appl. No.: 10/637,067

(22) Filed: Aug. 7, 2003

(65) Prior Publication Data

US 2005/0033953 A1 Feb. 10, 2005

(51) Int. Cl.
*G06F 9/00* (2006.01)

(52) U.S. Cl. .......................... 713/2; 713/100
(58) Field of Classification Search .......... 713/1, 713/2, 100
See application file for complete search history.

(56) References Cited

U.S. PATENT DOCUMENTS

| | | | | |
|---|---|---|---|---|
| 5,214,780 A | | 5/1993 | Ingoglia et al. | 395/600 |
| 5,584,023 A | | 12/1996 | Hsu | 395/620 |
| 5,812,843 A | | 9/1998 | Yamazaki et al. | 395/670 |
| 5,920,733 A | | 7/1999 | Rao | 395/888 |
| 5,950,011 A | | 9/1999 | Albrecht et al. | 395/712 |
| 6,002,869 A | | 12/1999 | Hinckley | 395/704 |
| 6,073,124 A | * | 6/2000 | Krishnan et al. | 705/59 |
| 6,079,047 A | | 6/2000 | Cotugno et al. | 714/807 |
| 6,279,109 B1 | * | 8/2001 | Brundridge | 713/2 |
| 6,279,124 B1 | | 8/2001 | Brouwer et al. | 714/38 |
| 6,601,096 B1 | * | 7/2003 | Lassiter, Jr. | 709/222 |
| 2002/0059263 A1 | | 5/2002 | Shima et al. | 707/100 |
| 2003/0204603 A1 | * | 10/2003 | Buchanan et al. | 709/228 |

FOREIGN PATENT DOCUMENTS

| | | |
|---|---|---|
| JP | 04-274535 | 9/1992 |
| JP | 05-040721 | 2/1993 |
| JP | 2001-022715 | 1/2001 |

OTHER PUBLICATIONS

"Pre/Post Processor," *IBM Technical Disclosure Bulletin*, vol. 37, No. 04A, Apr. 1994, pp. 263-264.

"Generic Code Page Conversion Application Program Interface," *IBM Technical Disclosure Bulletin*, vol. 34, No. 12, May 1992, pp. 421-430.

"Code Page Specification for Both Source and Destination File," *Research Disclosure*, Kenneth Mason Publications Ltd, England, Nov. 1990, No. 319, p. 1.

"Line Translation," via Internet at http://www.lugaru.com/man/Line+Translation.html, pp. 1-2.

"Editing Files of Remote Systems Using An Integrated Development Environment," Pending Patent Application, U.S. Appl. No. 10/285,996, filed Oct. 31, 2002, 49 pages.

"Transferring Data and Storing Metadata Across a Network," Pending Patent Application, U.S. Appl. No. 10/286,560, filed Oct. 31, 2002, 36 pages.

(Continued)

*Primary Examiner*—Dennis M. Butler
(74) *Attorney, Agent, or Firm*—Winstead Sechrest & Minick; John D. Flynn (57) ABSTRACT

A mechanism to acquire and deploy ("bootstrap") software files, particularly testcase files, across multiple hosts and platforms is provided. A software package is created and a predetermined bootstrap executable file is built into the package. A process on each host on which the software files are to be deployed extracts the bootstrap file and executes it. Each bootstrap executable builds corresponding software files into the software package. The process then extracts the files corresponding to its particular process from the software package.

27 Claims, 6 Drawing Sheets

OTHER PUBLICATIONS

"Dynamic Generic Framework For Distributed Tooling," Pending Patent Application, U.S. Appl. No. 10/134,190, filed Apr. 29, 2002, 80 pages.

"Toggleable Widget For A User Interface," Pending Patent Application, U.S. Appl. No. 10/286,583, filed Oct. 31, 2002, 19 pages.

"Framework To Access A Remote System From An Integrated Development Environment," Pending Patent Application, U.S. Appl. No. 10/286,559, filed Oct. 31, 2002, 52 pages.

"Accessing A Remote Iseries Or AS/400 Computer System From An Integrated Development Environment," Pending Patent Application, U.S. Appl. No. 10/285,993, filed Oct. 31, 2002, 48 pages.

* cited by examiner

SYSTEMS AND METHODS FOR A BOOTSTRAP MECHANISM FOR SOFTWARE EXECUTION

CROSS REFERENCE TO RELATED APPLICATIONS

The present invention is related to the following U.S. patent applications which are incorporated herein by reference, and filed concurrently herewith:

Ser. No. 10/636,988, entitled "Systems and Methods for Cooperatively Building Public File Packages";

Ser. No. 10/637,015, entitled "Systems and Methods for Packaging Files Having Automatic Conversion Across Platforms"; and Ser. No. 10/636,985, entitled "Systems and Methods for Synchronizing Software Execution Across Data Processing Systems and Platforms."

TECHNICAL FIELD

The present invention relates to the field of software automation in data processing systems, and in particular, to the acquisition and deployment of software (which may include executables, data files, instructions, etc.) across multiple hosts.

BACKGROUND INFORMATION

Software applications in modern enterprise data processing environments typically constitute many thousands of lines of source code and implement complex functionality. For example, the Apache web server, a widely available, open source web server, comprises at least 80,000 lines of source code. The Linux operating system, exceeds 1.6 million lines of source code. Testing such software products is a time-consuming task. Testing of software involves the invocation of the program functionality, and, typically, validating the correctness of the results of that functionality.

The testing of software includes the execution of one or more testcases which are designed to exercise the operations that implement the functionality of the software under task. The testcases are run to verify that the software under test does not fail for the testcase conditions, and additionally verify that the output generated is correct.

Generally, software testing includes activities that are performed by members of the software development team, and other activities that are automated, that is, performed by another software program.

Data processing systems, particularly in an enterprise environment, typically constitute a networked data processing system in which a set of commonly-accessed resources provide services to a multiplicity of users attached to the network. These services may include electronic mail (e-mail) services, Internet access, distributed computing services, input/output services, such as printing, etc. Moreover, the software deployed to provide such services as well as to access those services may be deployed across a multiplicity of platforms, that is, operating systems. Correspondingly, in the testing of a software product, may be desirable to run testcases across multiple hosts and platforms. Such a multihost testcase includes multiple testcase processes. Additionally, multiple testcase processes may run on a single host.

The testcases typically include multiple software files containing executable code and data. The set of files to execute the testcase on a particular host may depend on the host and runtime environment. The runtime environment may include the operating system deployed on the particular host, program environment (byte-code interpreted, such as Java or native) and the results of prior testcase runs.

The acquisition and deployment of the files to effect a particular testcase run on each host may represent a substantial effort in the software test cycle.

Consequently, there is a need in the art for systems and methods to automate the acquisition and deployment of software testcase files, particularly across multiple hosts and runtime environments.

SUMMARY OF THE INVENTION

The aforementioned needs are addressed by the present invention. Accordingly, there is provided in one embodiment a computer program product embodied in a tangible storage medium for bootstrapping software applications. The program product includes programming instructions for acquiring a file set for an application operable across multiple processes deployed on corresponding hosts. The programming instructions for acquiring said file set comprise a set of instructions in a bootstrap executable file included in a software package. For each host, programming instructions for copying one or more selected files from said file set to the host are included in the program product.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

A mechanism to acquire and deploy ("bootstrap") software files, particularly testcase files, across multiple hosts and platforms is provided. A software package is created and a predetermined bootstrap executable file is built into the package. A process on each host on which the software files are to be deployed extracts the bootstrap file and executes it. Each bootstrap executable builds corresponding software files into the software package. The process then extracts the files corresponding to its particular testcase (or other application) process from the software package.

In the following description, numerous specific details are set forth to provide a thorough understanding of the present invention. For example, particular file transfer protocols and file archive formats may be described, however, it would be recognized by those of ordinary skill in the art that the present invention may be practiced without such specific details, and in other instances, well-known circuits have been shown in block diagram form in order not to obscure the present invention in unnecessary detail. Refer now to the drawings wherein depicted elements are not necessarily shown to scale and wherein like or similar elements are designated by the same reference numeral for the several views.

Figure 1:
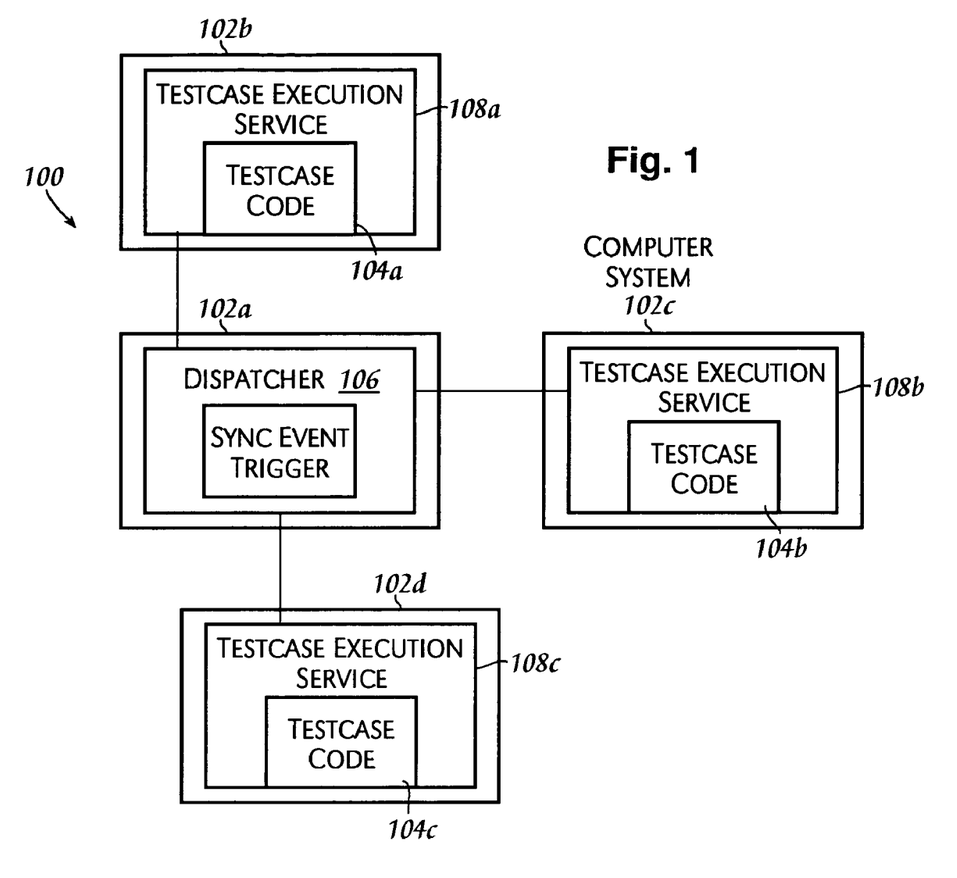
FIG. 1 illustrates an architecture for automating testcase execution in accordance with the present inventive principles.

FIG. 1 schematically illustrates a software automation architecture for executing testcases across multiple data processing hardware and platforms. This architecture may be used in conjunction with the present inventive principles. Architecture 100 includes a plurality of data processing systems 102a–102d which may be conventional workstations, server hardware or similar devices. In accordance with the present inventive principles, data processing systems 102b–102d need not have the same operating system (not shown). (An operating system may also be referred to as a platform.) In other words, a different operating system may be deployed on each of data processing systems 102b–102d, or different combinations of operating systems may be deployed on these data processing systems. Likewise, the operating system deployed on data processing system 102a may thus be different from any, or a subset, of the data processing systems deployed on data processing systems 102b–102d. In this way, the testcases, depicted in FIG. 1 as testcase code 104a–104c, may be executed across different platforms and data processing hardware. Systems and methods for automating software execution in conjunction with architecture 100 are further described in the commonly owned co-pending U.S. patent application Ser. No. 10/636, 985 entitled "Systems and Methods for Synchronizing Software Execution Across Data Processing Systems and Platforms," which is hereby incorporated herein by reference in its entirety.

The execution of a testcase across such a multiple hardware multiple platform architecture is mediated by dispatcher 106. The operation of dispatcher 106 will be discussed further hereinbelow. In particular, dispatcher 106 may provide synchronization services with respect to execution of the testcase, as discussed in conjunction with FIG. 3 and FIG. 5, below. Additionally, a testcase phase execution service 108a–108c may be included in each of data processing systems 102b–102d. The testcase phase execution service may provide a wrapper around the testcase software itself, and provide an interface between the testcase code and dispatcher 106. As described in the aforementioned U.S. patent application, the testcase phase execution service provides a mechanism for synchronization of the execution of the testcase, and an interface between the testcase executable and dispatcher 106.

A testcase may be executed in phases. In any particular phase, execution may be asynchronous across data processing systems and/or platforms. This may be effected using a testcase definition structure 200 illustrated in FIG. 2.

Figure 2:
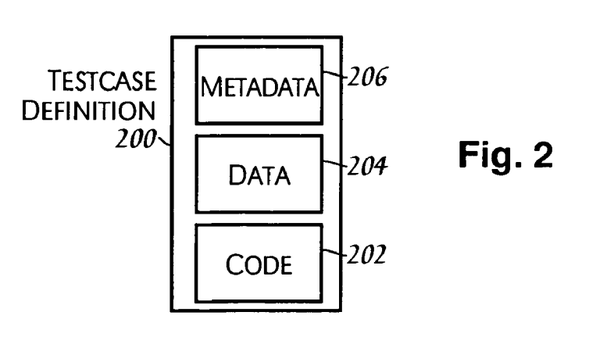
FIG. 2 illustrates, schematically, a testcase definition which may be used in conjunction with the architecture of FIG. 1.

Testcase definition 200 includes code 202 which may include the executable code that perform the operations constituting the test to be performed. (For the purposes herein, an executable file need not be restricted or limited to a native instruction binary file. Any file that includes code that may be executed without the need for an external compilation, regardless of the format may be an executable file. Such code may include shell scripts, scripts written in other scripting languages, for example Perl, or bytecode files executed by a virtual machine, such as Java class files. It would be understood by those of ordinary skill in the art that the present inventive principles may be applied in conjunction with any such executable code, and these embodiments would fall within the spirit and scope of the present invention.) Additionally, the testcase definition includes any data, 204 required by the operations constituting the test to be performed. For example, a testcase for a database client/ server application may include code for client-side and server-side operations on the database deployed in respective processes. The testcase definition may include data to initialize the database tables. Additionally, in accordance with the present inventive principles, testcase definition 200 includes metadata 206 which constitutes data about the testcase itself. This metadata may include, for example, the names or other type of identifier of each of the phases of the testcase. In other words, a testcase run may be viewed, in accordance with the principles of the present invention, as a sequence of execution phases punctuated by synchronization points. Between the synchronization points, as previously noted, the execution of the testcase across systems and/or platforms may be asynchronous.

Figure 3:
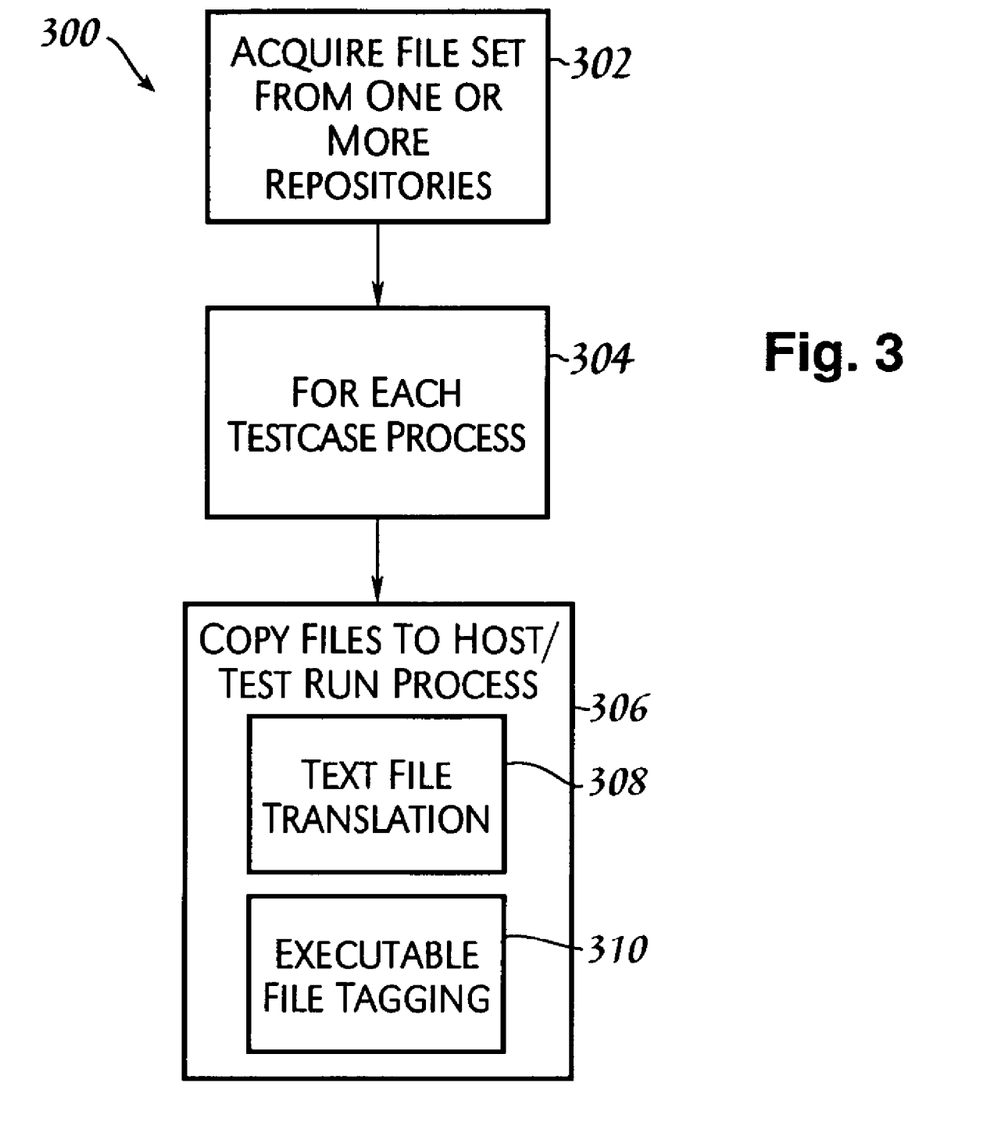
FIG. 3 illustrates a high-level flow diagram of a bootstrap mechanism in accordance with the principles of the present invention.

Refer now to FIG. 3 which illustrates a high-level flow diagram of a bootstrap process 300 in accordance with the present inventive principles. The flowcharts provided herein are not necessarily indicative of the serialization of operations being performed in an embodiment of the present invention. Steps disclosed within these flowcharts may be performed in parallel. The flowcharts are indicative of those considerations that may be performed to produce the operations available to bootstrap applications across multiple hosts and platforms. It is further noted that the order presented is illustrative and does not necessarily imply that the steps must be performed in the order shown.

In step 302, a file set is acquired from one or more repositories. For the purposes herein, the repository may be an FTP (File Transport Protocol) or HTTP (using the Hypertext Transfer Protocol) file server accessed via the respective transport protocol. Other file repository schemes are the Configuration Management and Version Control system (CMVC), a proprietary revision control system from IBM Corporation, Armonk, N.Y., and the Concurrent Version System (CVS), an open source file revision and control system based on a shared directory architecture. Note that the particular repository mechanisms used do not implicate the present inventive principles, and those of ordinary skill in the art would understand that any such repository may be used in conjunction therewith.

In step 304, process 300 loops over each testcase process. In step 306, the appropriate files are copied to the corresponding host and test run process. That is, in step 306, the files are copied to a directory corresponding to the test run process. Additionally, in step 306, any text file translation that may be necessary is performed (308) and any executable file tagging that is needed (310), based on the host platform and the originating platform for the testcase. Recall that testcases (or other applications) may be distributed across hosts having different operating systems. At least some of these may represent whitespace (particularly, carriage return and linefeed characters, collectively, "hard returns") in text files differently, and may also tag file types (such as text, binary and executable) files differently. Thus, translation of the hard return and file tagging may be needed to conform the files to the host platform on the host on which the files are being deployed. (Alternatively, code page translation between character sets may be performed.) Mechanisms for automatically performing such translations are described in the commonly-owned co-pending U.S. patent application, Ser. No. 10/637,015, entitled "Systems and Methods for Packaging Files Having Automatic Conversion Across Platforms," which is hereby incorporated herein by reference. Process 300 will be described in additional detail in conjunction with FIGS. 4–6 which illustrate processes for initiating construction of a bootstrap package, a process for executing a testcase build executable file which builds the required testcase files into the bootstrap package on the host executing the process, and a process for building the bootstrap package, which may be used by the testcase build executable.

Figure 4:
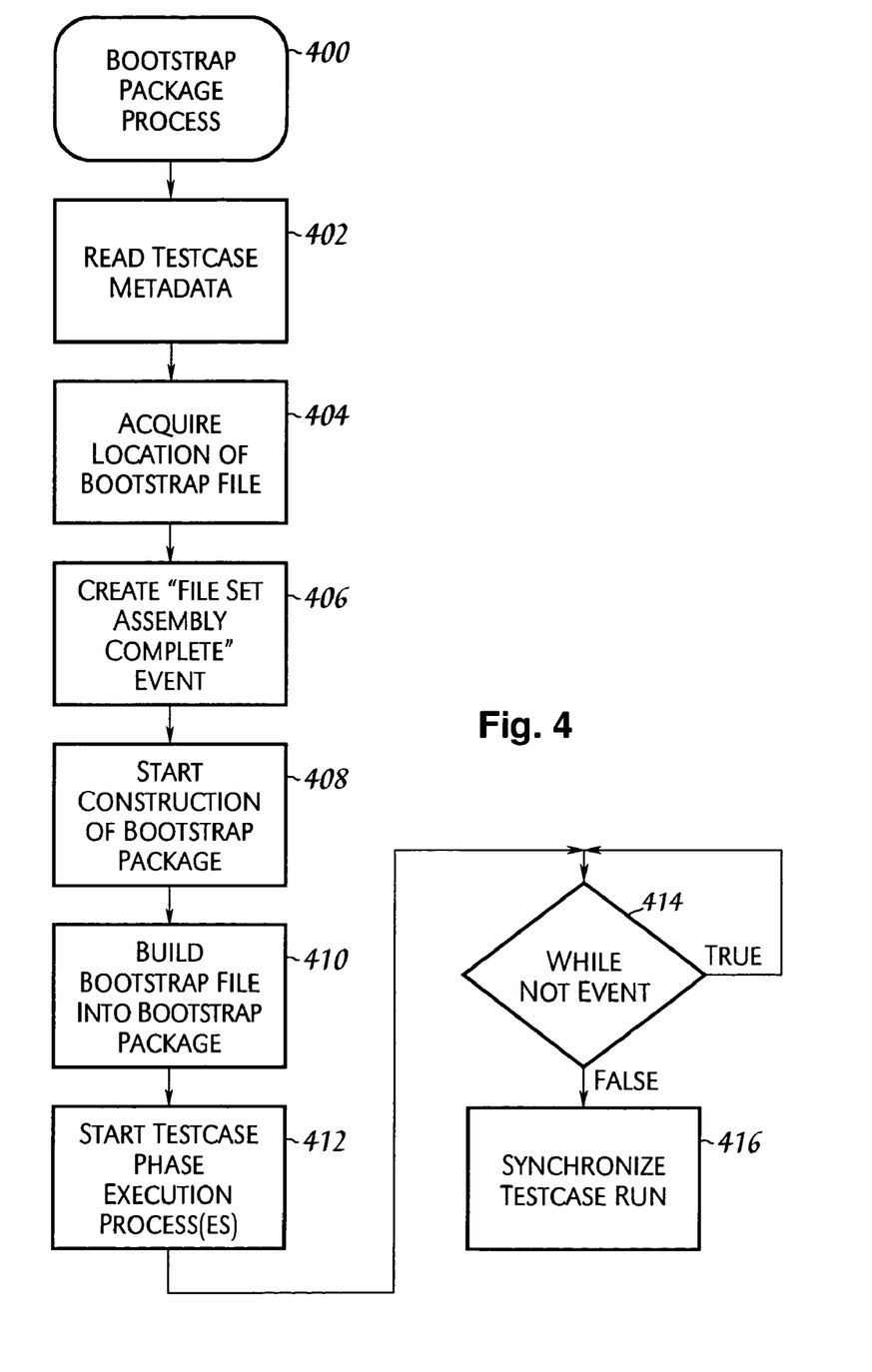
FIG. 4 illustrates, in flow chart form, a methodology for constructing testcase bootstrap packages across testcase hosts.

Refer now to FIG. 4, illustrating, in flowchart form a process 400 for initiating construction of testcase bootstrap packages across testcase hosts. In a software automation system in accordance with the architecture 100 illustrated in FIG. 1, process 400 may be performed by dispatcher 106. However, it would be appreciated by those of ordinary skill in the art that software automation may be implemented using other architectures, and process 400 may be adapted for use in such software automation architectures and such adaptations would fall within the spirit and scope of the present invention.

In step 402, testcase metadata is read. Testcase metadata constitutes data about the testcase itself. This may include the location (such as a pathname within a file repository) of a bootstrap file. In step 404, the location of a bootstrap file is acquired. The bootstrap file is an executable which builds the testcase files into a testcase bootstrap package. The testcase bootstrap file may be a shell script or other executable file, such as Java class file. The testcase bootstrap process corresponding to the executable will be discussed in conjunction with FIG. 6, below.

In step 406, a "File Set Assembly Complete Event" is created. This event may be used, as described below, to signal the completion of testcase package builds across a multiplicity of hosts.

In step 408, construction of the bootstrap file package is started. The bootstrap file package may be built using the mechanism described in the commonly-owned, co-pending U.S. patent application, Ser. No. 10/636,988, entitled "System and Method for Cooperatively Building Public File Packages," which is incorporated herein in its entirety by reference. In accordance with the mechanism therein, step 408 may be performed by issuing a START PUBPKG command to a public package builder server embodying the public package "builder" mechanism discussed therein. Parameters passed with the START PUBPKG command may be used to specify the package name, a list of builder names and other options, such as an autodelete option, etc. Note that the builder names may be associated with an instance of a testcase bootstrap process described in conjunction with FIG. 6 below. A software package may be a file archive in which files are stored, typically in compressed form. Commonly used file archive formats include Zip archives and the Java adaptation thereof, the JAR (Java ARchive) file. Additionally, the files may be specified in the archive file as a file pathname. In other words, a file may be logically "stored" in the archive as a hierarchy of directories/subdirectories by specifying a file pathname. The bootstrap file whose location was acquired in step 404 is built into the bootstrap package in step 410. This may be performed in accordance with the public package builder mechanism of the aforementioned commonly-owned, copending U.S. patent application, Ser. No. 10/636,988, entitled "System and Method for Cooperatively Building Public File Packages" by issuing a build pubpkg command to the public package server. (The "Done" parameter may also be included in the command to signal the public package server that no further builds will be issued by this process.)

In step 412, the testcase phase execution testcase builder processes are started. The testcase phase execution testcase builder process is described in conjunction with FIG. 5, below. Process 400 blocks on the event created in step 406, in step 414. On the triggering of the event, process 400 breaks out of the loop in step 414 and, in step 416, commence synchronization of the testcase. In the software automation architecture 100 illustrated in FIG. 1, the testcase may be executed by a phase execution service, such as phase execution service 108a–108c. A mechanism for executing a testcase via a phase execution service is described in the commonly-owned co-pending U.S. patent application, Ser. No. 10/636,985, entitled "Systems and Methods for Synchronizing Software Execution Across Data Processing Systems and Platforms," which is hereby incorporated herein in its entirety by reference. In accordance therewith, each phase execution service may have a unique name, determined from the testcase metadata which may be used in step 416 to launch the phase execution service for each of the corresponding testcase processes deployed on the respective hosts running the testcase.

Figure 5:
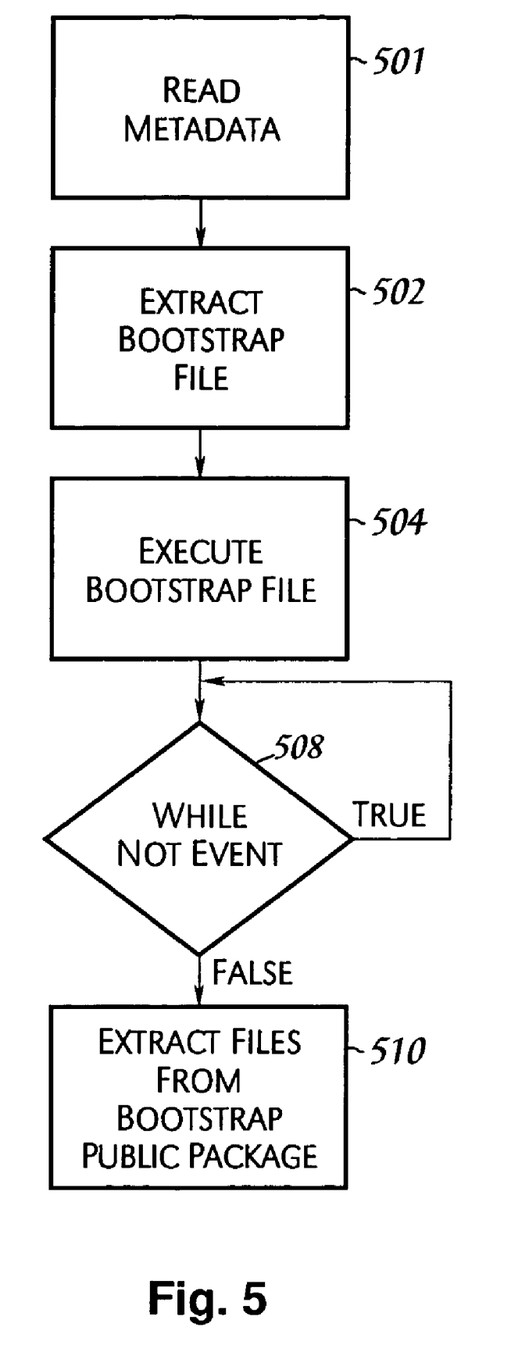
FIG. 5 illustrates, in flow chart form, a testcase builder process that may be used in conjunction with the methodology of FIG. 4.

Referring now to FIG. 5, there is illustrated therein process 500, a testcase phase execution testcase builder process. In a software automation architecture in accordance with architecture 100 of FIG. 1, process 500 may be included in testcase phase execution service 108a–108c. In other words, one of the processes available in a testcase phase execution service may be a testcase phase execution testcase builder process 500.

In step 501, metadata (such as metadata 206, FIG. 2) to read to acquire the command to issue to execute the testcase bootstrap file. For example, in an embodiment of metadata expressed in XML, the command could be addressable by a nested XML-like address, such as <TestcaseDefintion><testcaseid><BootstrapExecutionCommand>. This may return java mytbf (for a bootstrap executable in the form of a Java class file).

In step 502, the testcase bootstrap file built into the public package in step 410, FIG. 4, is extracted. This may be done, for example, by sending an extract pubpkg command to the public package server in an embodiment of the present invention using the aforementioned public package mechanism described in the U.S. Patent Application, entitled "System and Method for Cooperatively Building Public File Packages," and incorporated herein by reference. The command may for example include a parameter "/bootstrap/*" to extract any file in a "bootstrap" directory in the bootstrap package. It would be understood by those of ordinary skill in the art that such naming conventions are exemplary, and do not implicate the present inventive principles; any naming convention may be used in building the bootstrap package.

The bootstrap file is executed in step 504. The bootstrap file may be executed using the command acquired in step 501. As noted above, a bootstrap logic that may be embodied in the bootstrap file will be described in conjunction with FIG. 6.

On completion of the execution of the bootstrap file, process 500 blocks on the event created in step 406, FIG. 4. On the triggering of the event, process 500 breaks out of the loop in step 508, and, in step 510, extracts the files in the public package built via the execution of the bootstrap file. Each testcase execution service may have an associated unique identifier. As described below, files may be specified in the software package in a directory hierarchy so that each fileset is correlated with the respective host/testcase execution service by correspondingly locating the fileset in a directory hierarchy in the software package that uses the unique identifier of the testcase execution service. For example, files that are to go to all machines (hosts) may be specified by a pathname/allhosts/* (the "*" denoting the wildcard file name, that is, the "wildcard" character that matches any file name). Similarly, files that are to go to all processes may be specified by a pathname/allparticipants/*. These are exemplary, and the writer of the testcase (or other distributed application) may specify the directory pathnames which process 500 may determine by examining the bootstrap public package. The files are extracted to the local host, that is the host on which process 500 is running. The extracted files constitute the testcase process files needed by the phase execution service to execute the corresponding testcase process, as described in the aforementioned U.S. patent application entitled "Systems and Methods for Synchronizing Software Execution Across Data Processing Systems and Platforms" and incorporated herein by reference.

Figure 6:
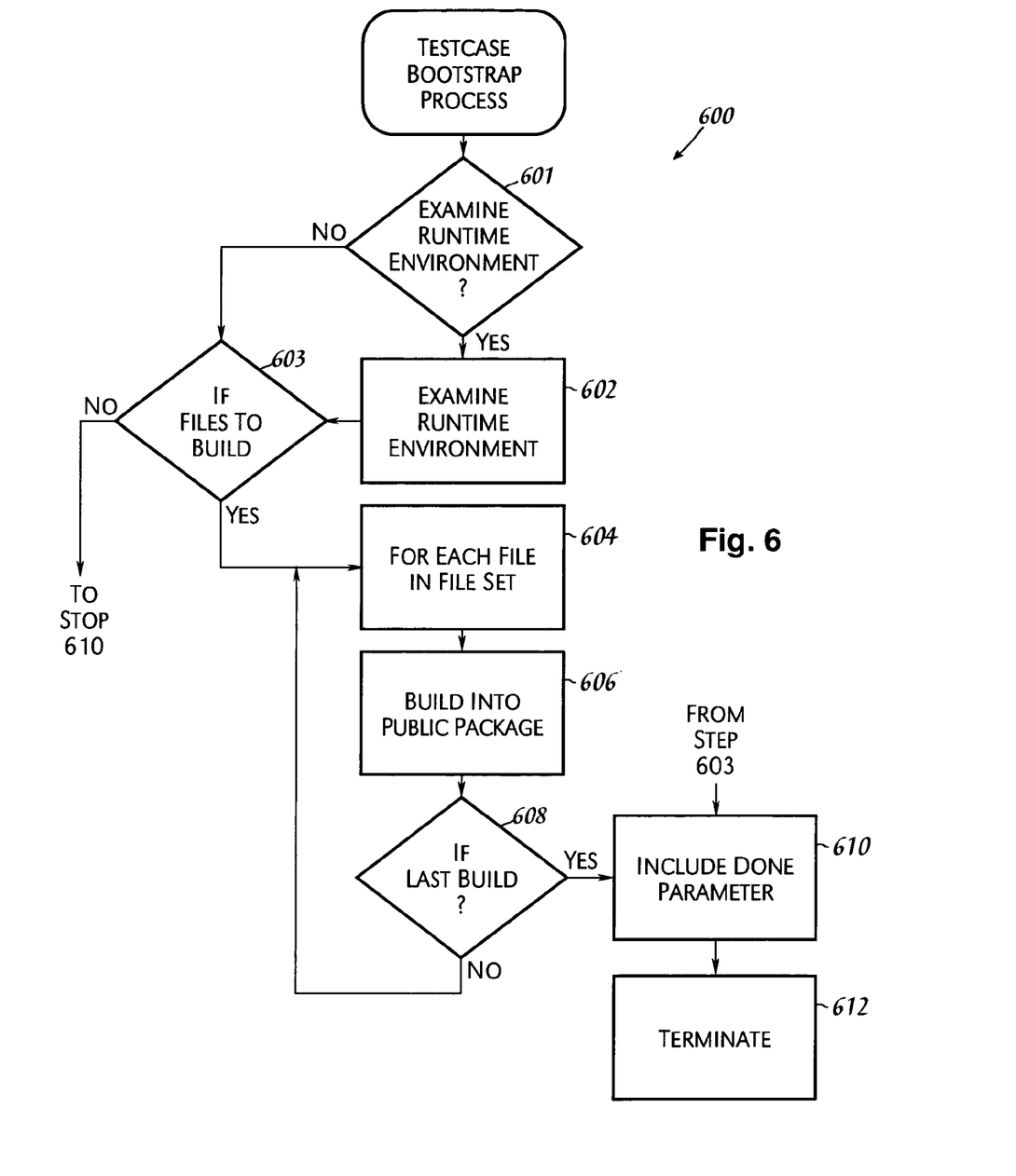
FIG. 6 illustrates, in flow chart form, a testcase bootstrap methodology in accordance with the principles of the present invention.

Refer now to FIG. 6, illustrating, in flowchart form, testcase bootstrap process 600. Process 600 may be embodied in a testcase bootstrap file, as previously noted.

If, in step 601, the runtime environment is to be examined, in step 602, process 600 examines the runtime environment. Note that step 601 need not necessarily be embodied in an explicit conditioned test. Step 601 may be implicit in step 602 in that the determination that a examination of the runtime environment is to be executed may be indicated by the inclusion of a command to perform the operation. In other words, if no command is included in the bootstrap executable to effect the examination of the runtime environment, then, perforce, the "outcome" of step 601 is "false." The converse is indicated by the presence of such a command. For example, in a Unix platform, the examination of the runtime environment may be performed by a shell command such as uname which may be included in a shell script embodying process 600. Examination of the runtime environment may be useful to effect interoperability of testcases across multiple versions of a software application, for example. Each process may build the corresponding set of files into the testcase package appropriate to the particular version of the application deployed on the target host.

If there are files to build, step 603, process 600 enters a loop over the files in the file set constituting the files for the testcase run. If there are no files to build, process 600 proceeds to step 610, described below.

In step 606, the files are built into the testcase software package. The files may be built into the package by issuing a corresponding build pubpkg command to the public package server. These commands may also determine where in the software package the respective files are stored. As noted above, files stored in the archive may be specified by a file pathname, representing a hierarchy of directories/subdirectories. This may be used to associate the files with a particular testcase execution service via a user-supplied identifier (i.e. name) of the service.

Step 608 closes the loop over files in the file set, and the process breaks out of the loop if the current build corresponds to the last file to be built into the package. If so, the last command may include the "Done" parameter, step 610 and process 600 terminates in step 612.

In an embodiment of the public package mechanism described in the U.S. patent application, entitled "System and Method for Cooperatively Building Public File Packages," the public package builder server may trigger the event "File Set Assembly Complete" created in step 406, FIG. 4. The public package builder server may trigger the event in response to all of the builders, which may be instances of process 600, issuing the "Done" parameter. In response, process 500, FIG. 5 unblocks in step 508, and extracts the respective files to the corresponding host, step 510.

In an embodiment of the present invention using the phase execution service described in the aforementioned U.S. patent application Ser. No. 10/636,985 entitled "Systems and Methods for Synchronizing Software Execution Across Data Processing Systems and Platforms, the execution of the testcase processes may then be executed by the respective phase execution services with sequencing of the phases operating as described therein. In this respect, recall that in step 414, FIG. 4, process 400 unblocks on the "File Set Assembly Complete Event" and may accordingly effect the synchronization of the testcase processes, as described in conjunction with step 416, FIG. 4.

Figure 7:
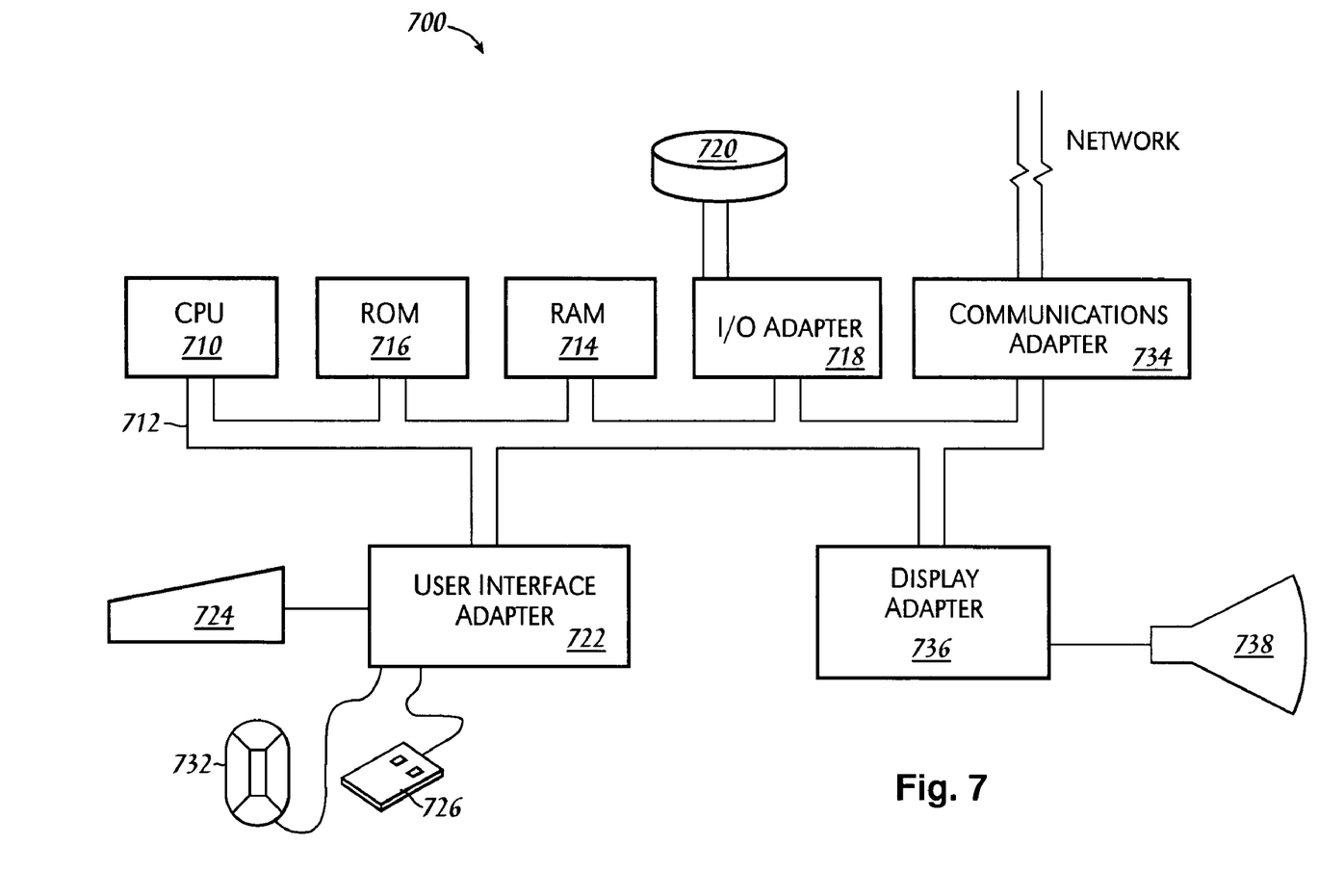
FIG. 7 in block diagram form, a data processing system which may be use in conjunction with the methodologies incorporating the present inventive principles.

Referring now to FIG. 7, there is illustrated an exemplary hardware configuration of data processing system 700 in accordance with the subject invention. In one embodiment, this system in conjunction with architecture 100, FIG. 1, including data processing systems 102a–102d and, correspondingly with the methodologies in FIGS. 3–6 for bootstrapping software applications, such as software testcases, across multiple hosts and platforms. Data processing system 700 includes central processing unit (CPU) 710, such as a conventional microprocessor, and a number of other units interconnected via system bus 712. Data processing system 700 also includes random access memory (RAM) 714, read only memory (ROM) 716 and input/output (I/O) adapter 718 for connecting peripheral devices such as disk units 720 to bus 712, user interface adapter 722 for connecting keyboard 724, mouse 726, trackball 732 and/or other user interface devices such as a touch screen device (not shown) to bus 712. System 700 also includes communication adapter 734 for connecting data processing system 700 to a data processing network, enabling the system to communicate with other systems, and display adapter 736 for connecting bus 712 to display device 738. CPU 710 may include other circuitry not shown herein, which will include circuitry commonly found within a microprocessor, e.g. execution units, bus interface units, arithmetic logic units, etc. CPU 710 may also reside on a single integrated circuit.

Preferred implementations of the invention include implementations as a computer system programmed to execute the method or methods described herein, and as a computer program product. According to the computer system implementation, sets of instructions for executing the method or methods are resident in the random access memory 714 of one or more computer systems configured generally as described above. In one embodiment, these sets of instructions, in conjunction with system components that execute them may effect the bootstrapping of software applications across multiple hosts and platforms as described in conjunction with FIGS. 3–6, for example. Until required by the computer system, the set of instructions may be stored as a computer program product in another computer memory, for example, in disk drive 720 (which may include a removable memory such as an optical disk or floppy disk for eventual use in the disk drive 720). Further, the computer program product can also be stored at another computer and transmitted to the users work station by a network or by an external network such as the Internet. One skilled in the art would appreciate that the physical storage of the sets of instructions physically changes the medium upon which is the stored so that the medium carries computer readable information. The change may be electrical, magnetic, chemical, biological, or some other physical change. While it is convenient to describe the invention in terms of instructions, symbols, characters, or the like, the reader should remember that all of these in similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Though the present inventive principles have been described in the context of a multihost, multiplatform testcase correspondingly distributed across a multiplicity of testcase processes, those of ordinary skill in the art would recognize such a testcase as an exemplar of a scaleable, distributed application. It would be further appreciated by those of ordinary skill in the art that any such distributed application may be "bootstrapped" in accordance with the principles of the present invention, and such embodiments would fall within the spirit and scope of the present invention.

Although the present invention and its advantages have been described in detail, it should be understood that various changes, substitutions and alterations can be made herein without departing from the spirit and scope of the invention as defined by the appended claims.

What is claimed is:

1. A computer program product embodied in a tangible storage medium, the program product for bootstrapping application execution, the program product including programming instructions for:
   acquiring a file set for an application operable across multiple processes deployed on a set of hosts, said programming instructions for acquiring said file set comprising a set of instructions in a bootstrap executable file included in a software package;
   building each selected file into said software package wherein programming instructions for building each file of said file set into said software package are included in said bootstrap executable file; and
   executing said bootstrap file.

2. The computer program product of claim 1 and further comprising programming instruction for creating an event operable for triggering in response to a completion of an assembly of the software package on each host.

3. The computer program product of claim 2 and further comprising programming instructions for starting construction of said software package.

4. The computer program product of claim 3 and further comprising programming instructions for building said bootstrap executable into said software package.

5. The computer program product of claim 4 further comprising programming instructions for extracting said bootstrap executable file from said software package.

6. The computer program product of claim 1 and further comprising programming instructions for extracting files from the software package onto a corresponding host.

7. The computer program product of claim 1 and further comprising programming instructions for reading metadata to determine a command for executing said bootstrap file.

8. The computer program product of claim 1 and further comprising programming instructions for acquiring a location of said bootstrap executable file.

9. A method for bootstrapping a software application comprising:
   acquiring a file set for an application operable across multiple processes deployed on corresponding hosts, said step of acquiring said file set performed in response to a set of instructions in a bootstrap executable file included in a software package;
   building each selected file into said software package wherein programming instructions for building each file of said file set into said software package are included in said bootstrap executable file; and
   executing said bootstrap file.

10. The method of claim 9 and further comprising creating an event operable for triggering in response to a completion of an assembly of the software package on each host.

11. The method of claim 9 and further comprising extracting files from the software package onto a corresponding host.

12. The method of claim 11 and further comprising starting construction of said software package.

13. The method of claim 12 and further comprising building said bootstrap executable into said software package.

14. The method of claim 13 and further comprising extracting said bootstrap executable file from said software package.

15. The method of claim 9 and further comprising reading metadata to determine a command for executing said bootstrap file.

16. The method of claim 15 and further comprising acquiring a location of said bootstrap executable file.

17. A data processing system for bootstrapping a software application comprising:
   circuitry operable for acquiring a file set for an application operable across multiple processes deployed on corresponding hosts, wherein said acquiring said file set is performed in response to a set of instructions in a bootstrap executable file included in a software package;
   circuitry operable for building each selected file into said software package wherein programming instructions for building each file of said file set into said software package are included in said bootstrap executable file; and
   circuitry operable for executing said bootstrap file.

18. The data processing system claim of 17 and further comprising circuitry operable for creating an event operable for triggering in response to a completion of an assembly of the software package on each host.

19. The data processing system of claim 18 and further comprising circuitry operable for starting construction of said software package.

20. The data processing system of claim 19 and further comprising circuitry operable for building said bootstrap executable into said software package.

21. The data processing system of claim 20 and further comprising circuitry operable for extracting said bootstrap executable file from said software package.

22. The data processing system of claim 17 and further comprising circuitry operable for extracting files from the software package onto a corresponding host.

23. The data processing system of claim 17 and further comprising circuitry operable for reading metadata to determine a command for executing said bootstrap file.

24. The data processing system of claim 17 and further comprising circuitry operable for acquiring a location of said bootstrap executable file.

25. A computer program product embodied in a tangible storage medium, the program product for bootstrapping application execution, the program product including programming instructions for:

acquiring a file set for an application operable across multiple processes deployed on a set of hosts, said programming instructions for acquiring said file set comprising a set of instructions in a bootstrap executable file included in a software package, said programming instructions for copying one or more selected files from said acquired file set to each host;

for each host, building each selected file from said acquired file set into said software package wherein programming instructions for building each file of said file set into said software package are included in said bootstrap executable file; and executing said bootstrap file.

26. A method for bootstrapping a software application comprising the steps of:

acquiring a file set for an application operable across multiple processes deployed on corresponding hosts, said step of acquiring said file set performed in response to a set of instructions in a bootstrap executable file included in a software package, said programming instructions for copying one or more selected files from said acquired file set to each host;

for each host, building each selected file from said acquired file set into said software package wherein programming instructions for building each file of said file set into said software package are included in said bootstrap executable file; and executing said bootstrap file.

27. A data processing system for bootstrapping a software application comprising:

circuitry operable for acquiring a file set for an application operable across multiple processes deployed on corresponding hosts, wherein said acquiring said file set is performed in response to a set of instructions in a bootstrap executable file included in a software package, said programming instructions for copying one or more selected files from said acquired file set to each host;

circuitry operable for building each selected file from said acquired file set into said software package wherein programming instructions for building each file of said file set into said software package are included in said bootstrap executable file; and circuitry operable for executing said bootstrap file.

* * * * *